(12) United States Patent
Uskert et al.

(10) Patent No.: US 12,534,183 B2
(45) Date of Patent: Jan. 27, 2026

(54) EXTENDABLE WING

(71) Applicant: Textron Systems Corporation, Hunt Valley, MD (US)

(72) Inventors: Richard C. Uskert, Monkton, MD (US); Donovan Ray McClelland, Baltimore, MD (US); Joshua Stephen Ruck, Baltimore, MD (US); Daniel Thomas Otradovec, Forest Hill, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 0 days.

(21) Appl. No.: 19/058,439

(22) Filed: Feb. 20, 2025

(65) Prior Publication Data

US 2025/0263164 A1 Aug. 21, 2025

Related U.S. Application Data

(60) Provisional application No. 63/555,994, filed on Feb. 21, 2024.

(51) Int. Cl.
  *B64C 3/56* (2006.01)
  *B64C 3/18* (2006.01)
  *B64C 3/26* (2006.01)

(52) U.S. Cl.
  CPC ............... *B64C 3/56* (2013.01); *B64C 3/185* (2013.01); *B64C 3/26* (2013.01)

(58) Field of Classification Search
  CPC ..................................... B64C 3/56; B64C 3/54
  See application file for complete search history.

(56) References Cited

U.S. PATENT DOCUMENTS

| | | | |
|---|---|---|---|
| 1,833,995 A | 12/1931 | Jensen | |
| 2,074,099 A | 3/1937 | Adams | |
| 2,743,072 A * | 4/1956 | Emmi | B64C 3/54 244/6 |
| 6,834,835 B1 | 12/2004 | Knowles et al. | |
| 7,762,500 B1 * | 7/2010 | Dhall | B64C 37/00 244/45 R |
| 7,789,343 B2 | 9/2010 | Sarh et al. | |
| 7,832,690 B1 | 11/2010 | Levine et al. | |
| 7,866,610 B2 | 1/2011 | Bousfield | |
| 8,439,314 B1 | 5/2013 | Dhall | |
| 9,010,693 B1 | 4/2015 | Barbieri | |
| 9,139,284 B1 | 9/2015 | Dhall | |

(Continued)

*Primary Examiner* — Timothy D Collins
*Assistant Examiner* — Eric Acosta
(74) *Attorney, Agent, or Firm* — BainwoodHuang

(57) ABSTRACT

An aircraft wing apparatus includes a plurality of wing-skin sections, an extendable spar assembly, and a controller. The plurality of wing-skin sections includes a first wing-skin section and a second wing-skin section. The extendable spar assembly includes a first spar member coupled with the first wing-skin section and a second spar member coupled with the second wing-skin section. The controller is constructed and arranged to move the second spar member to predefined positions relative to the first spar member to place the plurality of wing-skin sections into predefined configurations. The predefined configurations including a stowed configuration, a first deployed configuration, and a second deployed position that is different from the first deployed position.

19 Claims, 13 Drawing Sheets

(56) References Cited

U.S. PATENT DOCUMENTS

| | | | |
|---|---|---|---|
| 9,371,130 | B1 | 6/2016 | Barbieri |
| 9,522,725 | B2 | 12/2016 | Torre |
| 9,580,165 | B1 | 2/2017 | Alley et al. |
| 10,287,013 | B2 | 5/2019 | Starace et al. |
| 10,967,956 | B2 | 4/2021 | Neiser |
| 11,691,713 | B2 | 7/2023 | Mehrgan |
| 2009/0206193 | A1 | 8/2009 | File |
| 2010/0148011 | A1 | 6/2010 | Sanderson |
| 2015/0225072 | A1 | 8/2015 | Torre |
| 2018/0327077 | A1 | 11/2018 | Mccoy |
| 2021/0206470 | A1 | 7/2021 | Braverman et al. |

\* cited by examiner

EXTENDABLE WING

CROSS REFERENCE TO RELATED APPLICATIONS

This application claims priority to and the benefit of earlier-filed U.S. Application No. 63/555,994, filed on Feb. 21, 2024, and entitled "Extendable Wing", the contents and teachings of which are hereby incorporated by reference in their entirety.

BACKGROUND

Some conventional drones include rotors that provide vertical thrust for vertical takeoff and landing (VTOL). On a first type of conventional drone, the rotors are fixed to static wings that remain in the same orientation for both VTOL and forward flight. On a second type of conventional drone, the rotors are fixed to pivotable wings that rotate to position the rotors in different directions.

To transition to forward flight, these drones operate separate horizontal thrusters or rotate the VTOL rotors horizontally to provide forward thrust. For example, on the drones with pivotable wings, the wings are initially positioned vertically to orient the rotors for takeoff. Once airborne, the pivotable wings are rotated horizontally to orient the rotors for forward flight, enabling the wings to provide vertical lift.

SUMMARY

Unfortunately, there are deficiencies to the above-described conventional drones. Along these lines, these drones have rigid, fixed-length wings that limit their suitability to satisfy certain types of mission requirements. For example, a conventional drone with short wings may not have suitable aerodynamic efficiency for long distance flights. In contrast, a conventional drone with long wings may not have suitable maneuverability or speed.

Further, such fixed-length wings suffer from a constant drag profile which necessitates varying amounts of forward thrust to fly at different speeds. Propulsive units generally are not optimized around multiple thrust requirements, and thus introduce inefficiencies during operation.

Even further, some conventional drones present deficiencies while landing. For example, when landing conventional drones with pivotable wings, the wings rotate to face perpendicularly to wind directions (e.g., aftward to face the sides the drone's body, upwards, or a combination of both). Orienting the wings in this manner increases surface areas exposed to crosswinds, increasing destabilizing forces on the drone and decreasing positional accuracy and control over the drone. As a result, the drone may drift excessively when landing, presenting safety risks to equipment and personnel.

In contrast to the above-described conventional drones having fixed-length wings, improved techniques are directed to utilizing a wing apparatus having an extendable (or adjustable) spar. The extendable spar may be extended, in part or in whole, to increase wing surfaces that contribute to lift, increasing aerodynamic performance of an aircraft. Additionally, the extendable spar may be retracted (or consolidated) to minimize crosswind forces against the aircraft and to reduce a footprint of the aircraft for landing and/or takeoff in locations where space is limited (e.g., ship decks, etc.). Accordingly, the wing surfaces are modifiable to provide a variety of wing profiles for different mission requirements.

One embodiment is directed to an aircraft wing apparatus. The aircraft wing apparatus includes a plurality of wing-skin sections having a first wing-skin section and a second wing-skin section. The aircraft wing apparatus further includes an extendable spar assembly including a first spar member coupled with the first wing-skin section and a second spar member coupled with the second wing-skin section. The aircraft wing apparatus further includes a controller constructed and arranged to move the second spar member to predefined positions relative to the first spar member to place the plurality of wing-skin sections into predefined configurations. The predefined configurations include a stowed configuration, a first deployed configuration, and a second deployed position that is different from the first deployed position.

Another embodiment is directed to an aircraft including an aircraft body, an engine, and an aircraft wing apparatus. The engine is coupled with the aircraft body and is constructed and arranged to provide power for forward flight. The aircraft wing apparatus is coupled with the aircraft body. The aircraft wing apparatus includes a plurality of wing-skin sections having a first wing-skin section and a second wing-skin section. The aircraft wing apparatus further includes an extendable spar assembly including a first spar member coupled with the first wing-skin section and a second spar member coupled with the second wing-skin section. The aircraft wing apparatus further includes a controller constructed and arranged to move the second spar member to predefined positions relative to the first spar member to place the plurality of wing-skin sections into predefined configurations. The predefined configurations include a stowed configuration, a first deployed configuration, and a second deployed position that is different from the first deployed position.

Yet another embodiment is directed to a method of controlling an aircraft wing apparatus coupled with an aircraft. The method includes accessing a controller constructed and arranged to operate an extendable spar assembly of the aircraft wing apparatus. The extendable spar assembly includes a first spar member and a second spar member. The first spar member is coupled with a first wing-skin section of a plurality of wing-skin sections. The second spar member is coupled with a second wing-skin section of the plurality of wing-skin sections. The method further includes moving the second spar member to a first predefined position relative to the first spar member to place the plurality of wing-skin sections from a stowed configuration into a first deployed configuration. The method further includes moving the second spar member to a second predefined position relative to the first spar member to place the plurality of wing-skin sections into a second deployed configuration, the first deployed configuration being different from the second deployed configuration.

In some arrangements, the first spar member defines a channel, at least part of the second spar member being constructed and arranged to slide within the channel when moving relative to the first spar member.

In some arrangements, an outer end of the second wing-skin section in the first deployed configuration laterally extends a first predefined distance away from an outer end of the first wing-skin section. Further, the outer end of the second wing-skin section in the second deployed configuration laterally extends a second predefined distance away from the outer end of the first wing-skin section. The first predefined distance is different from the second predefined distance.

In some arrangements, the controller includes an actuation assembly including a pulley wheel and a pulley cable, the pulley wheel being disposed at an outer portion of the first spar member. The pulley cable interfaces with the pulley wheel and has an end coupled with an inner portion of the second spar member. The controller further includes a set of motors constructed and arranged to actuate the pulley cable to extend the second spar member relative to the first spar member.

In some arrangements, the extendable spar further includes a third spar member coupled with a third wing-span section of the plurality of wing-span sections. Further, the actuation assembly includes a second pulley wheel and a second pulley cable. The second pulley wheel is disposed on an outer portion of the second spar member. The second pulley cable interfaces with the second pulley wheel and is coupled between the first spar member and the third spar member. The second pulley cable is constructed and arranged to extend the third spar member relative to the first spar member based on extension of the second spar member by the set of motors.

In some arrangements, the set of motors are further constructed and arranged to retract the second spar member relative to the first spar member.

In some arrangements, the extendable spar further includes a third spar member coupled with a third wing-span section of the plurality of wing-span sections. Further, the controller includes a retraction assembly including a retraction pulley wheel and a retraction pulley cable. The retraction pulley wheel is disposed at an inner portion of the second spar member. A retraction pulley cable interfaces with the retraction pulley wheel and is coupled with the first spar member and the third spar member. The retraction pulley cable is constructed and arranged to retract the third spar member relative to the first spar member based on retraction of the second spar member by the set of motors.

In some arrangements, the first wing-skin section and the second wing-skin section include respective forward ends and respective aft ends. A first distance between the respective forward ends is less than a second distance between the respective aft ends.

In some arrangements, the aircraft wing apparatus further includes a plurality of wing ribs disposed between the plurality of wing-skin sections and the extendable spar. The plurality of wing ribs includes a first group of wing ribs which supports the first wing-skin section and a second group of wing ribs which supports the second wing-skin section.

In some arrangements, wing ribs of the plurality of wing ribs are coupled together via a scissor linkage assembly. The scissor linkage assembly is constructed and arranged to extend and retract the wing ribs of the plurality of wing ribs relative to each other.

In some arrangements, the plurality of wing ribs includes a first wing rib, a second wing rib, and a set of wing ribs disposed between the first wing rib and the second wing rib. The first wing rib is fixedly attached to the first spar member. The second wing rib is fixedly attached to the second spar member. The set of wing ribs is constructed and arranged to move relative to both the first wing rib and the second wing rib based on movement of the second spar member relative to the first spar member.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to a wing apparatus having an extendable (or adjustable) spar. The extendable spar may be extended, in part or in whole, to increase wing surfaces that contribute to lift, increasing aerodynamic performance of an aircraft. Additionally, the extendable spar may be retracted (or consolidated) to minimize crosswind forces against the aircraft and to reduce a footprint of the aircraft, e.g., for landing and/or takeoff in locations where space is limited. In this manner, the wing apparatus provides a variety of wing profiles for different mission requirements.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
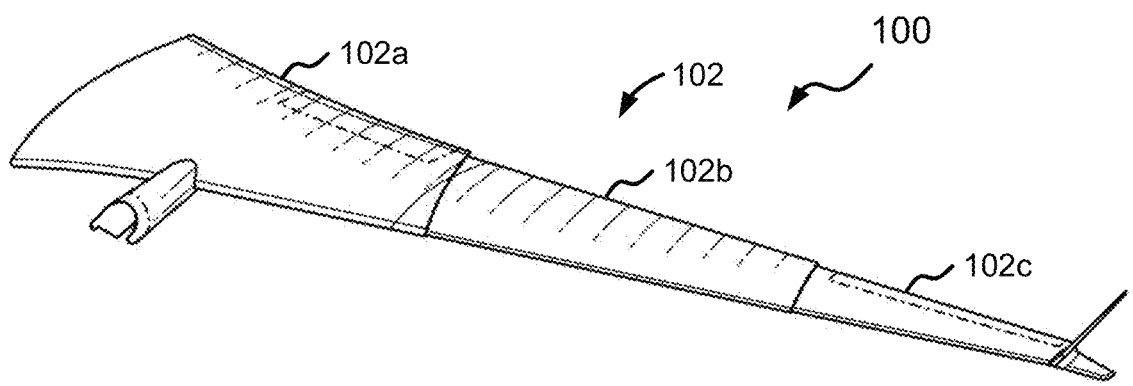
FIGS. 1-2 illustrate perspective views of an example aircraft wing apparatus, according to some embodiments of the present disclosure.
Figure 2:
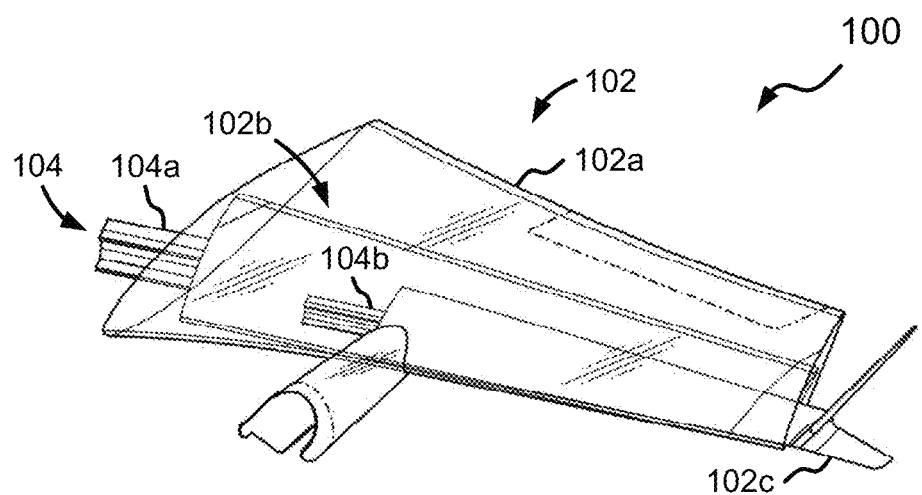

FIGS. 1 and 2 show various views of an example aircraft wing apparatus 100 that extends and retracts to provide different wing profiles for an aircraft. FIG. 1 shows the aircraft wing apparatus 100 in a fully extended (deployed) configuration. FIG. 2 shows the aircraft wing apparatus 100 in a retracted (stowed) configuration. As described in greater detail below, one or more features are hidden from view in FIG. 2 to highlight certain aspects of the aircraft wing apparatus 100. Additionally, one or more features are shown as transparent to show internal details of the aircraft wing apparatus 100.

The aircraft wing apparatus 100 includes wing-skin sections 102a, 102b, and 102c (collectively, wing-skin sections 102) and an extendable spar assembly 104. The wing-skin sections 102 are constructed and arranged to provide an airfoil that generates vertical lift during forward flight. As best shown in FIG. 2, the wing-skin sections 102 may be nested within each other to reduce a lateral length of the aircraft wing apparatus 100. Along these lines, the wing-skin section 102b defines a space for stowing the wing-skin section 102c, and the wing-skin section 102a defines a space for stowing both the wing-skin section 102b and the wing-skin section 102c. In some embodiments, the wing-skin sections 102 include various flight control surfaces, such as ailerons, elevators, flaps, and so forth, to adjust aircraft positioning during flight.

As shown in FIG. 2, the extendable spar assembly 104 includes spar members 104b and 104c. The spar member 104b is fixedly attached to the wing-skin section 102b, and the spar member 104b is fixedly attached to the wing-skin section 102c. It should be understood that portions of the spar members 104b and 104c may extend into their respective wing-skin sections 102b and 102c. These portions are hidden from view for simplicity. Further, one or more additional spar members may be provided, e.g., another spar member may be fixedly attached to the wing-skin section 102a. In some embodiments, part of extendable spar 104 extends into and couples with an aircraft body (e.g., a fuselage).

The spar member 104b defines a lateral channel within which the spar member 104c may be wholly or partially contained. The spar member 104c is constructed and arranged to slide within the channel when extending or retracting the wing-skin section 102c relative to the wing-skin section 102b. The spar members 104b and 104c may be maintained (or held) different positions to place the wing-skin sections 102 into predefined configurations, e.g., fully stowed, fully extended, partially extended, and so forth.

During example operation, the spar members 104b and 104c slide relative to the wing-skin section 102a to extend and retract the wing-skin sections 102b and 102c. When the spar members 104a and 104b are in a stowed (e.g., fully retracted) configuration (e.g., as shown in FIG. 2), the wing-skin sections 102b and 102c are housed within the wing-skin section 102a. Advantageously, while the aircraft wing apparatus 100 is in the stowed configuration, crosswind forces acting on the aircraft wing apparatus 100 may be minimized. As a result, the aircraft wing apparatus 100 provides improved positional accuracy and stability during vertical takeoff and landing (VTOL).

Further, the spar members 104b and 104c may be moved to predefined positions to place the wing-skin sections 102 into various deployed configurations. For example, in a first deployed configuration, the wing-skin sections 102 may be fully extended to provide a first wing profile. In a second deployed configuration, the wing-skin sections 102 may be partially extended to provide a second wing profile.

Advantageously, the variable wing profiles enable the aircraft wing apparatus 100 to dynamically adjust flight characteristics (e.g., maneuverability, aerodynamic efficiency, and so forth) before or during flight. In this manner, the aircraft wing apparatus 100 may be adapted to best suit a variety of mission parameters and flight modes (e.g., dash to target, loiter to target, combinations thereof, etc.). For example, in the embodiments discussed above, the first deployed configuration may be directed to providing higher endurance and fuel efficiency for longer flight and/or increased payload delivery. In contrast, the second deployed configuration may be directed to providing increased aircraft maneuverability and reducing parasitic drag on the aircraft for faster travel.

Further, while in the stowed configuration (e.g., by fully retracting the spar), the aircraft wing apparatus may reduce the surface area of exposed to crosswind forces, e.g., to improving positional accuracy when vertically landing and reducing an overhead footprint of the aircraft. In this manner, the aircraft may land on smaller landing areas (e.g., certain ship decks, etc.). Further details will now be provided with reference to FIGS. 3 through 8.

Figure 3:
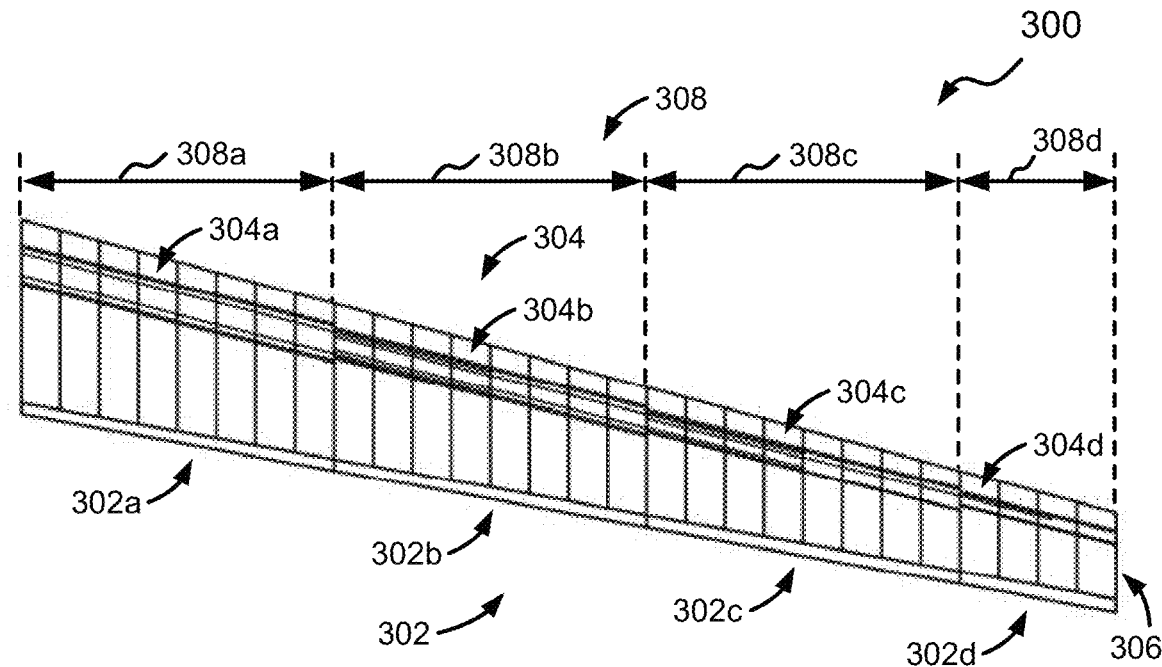
FIGS. 3-8 illustrate perspective views of another example aircraft wing apparatus, according to some embodiments of the present disclosure.
Figure 4:
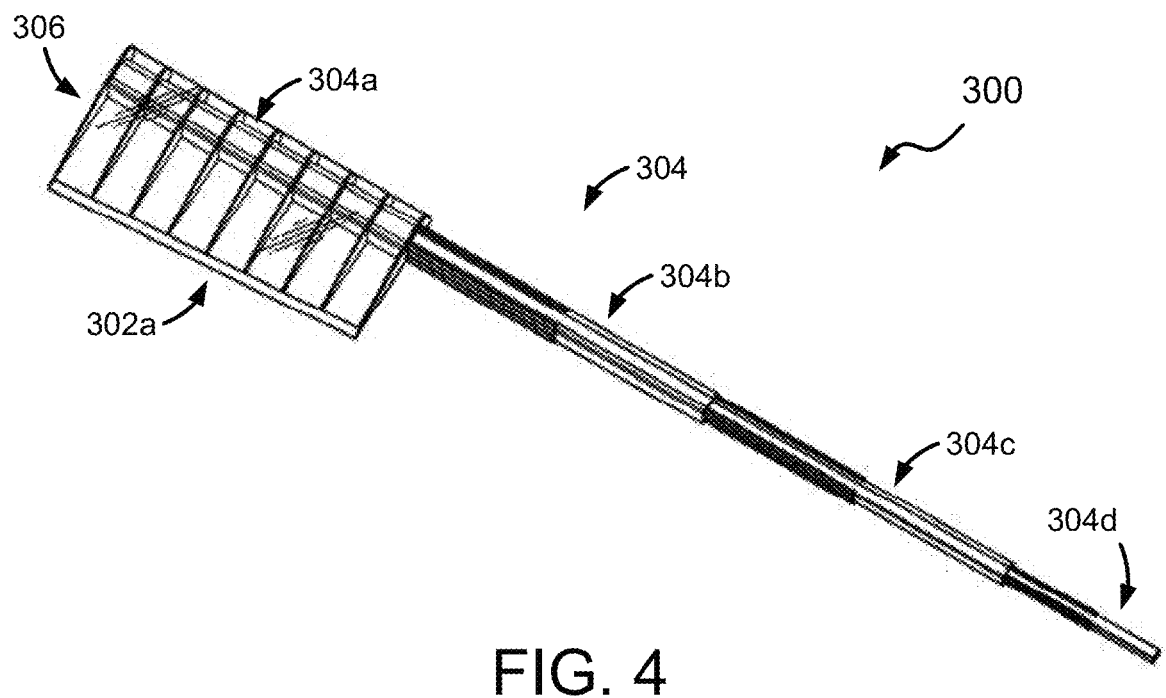
Figure 5:
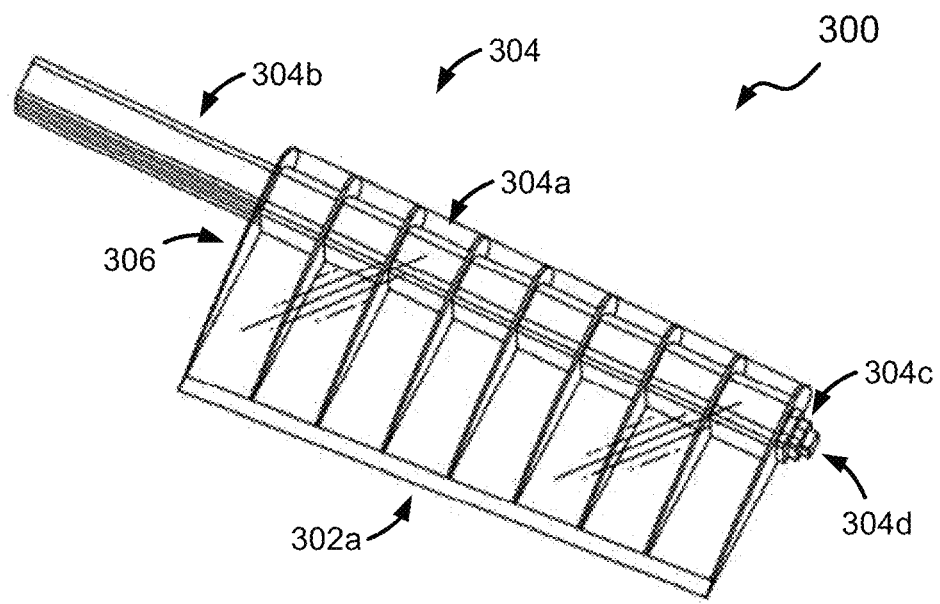
Figure 6:
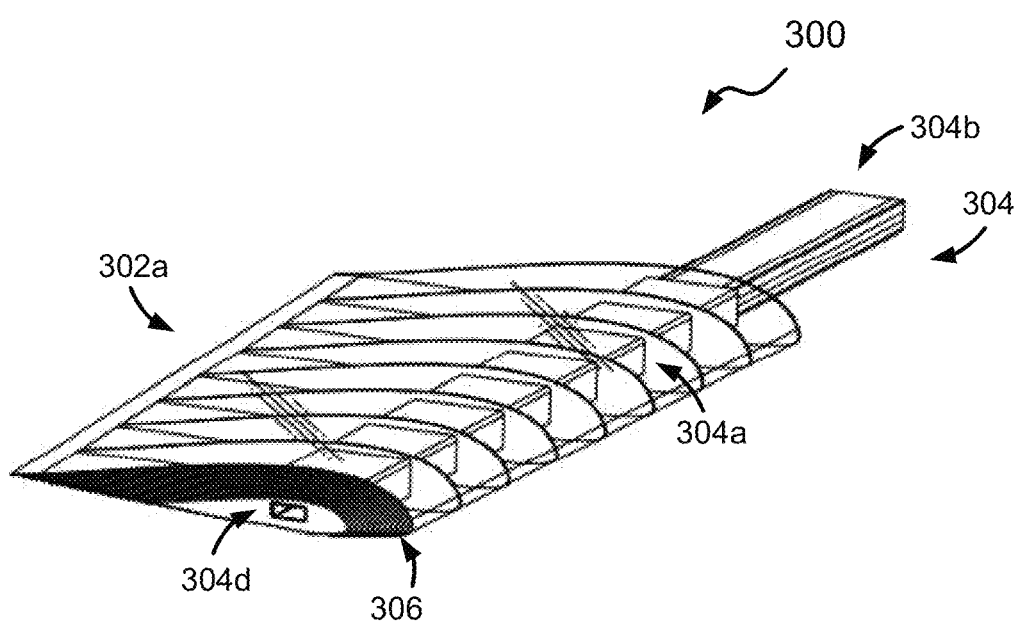
Figure 7:
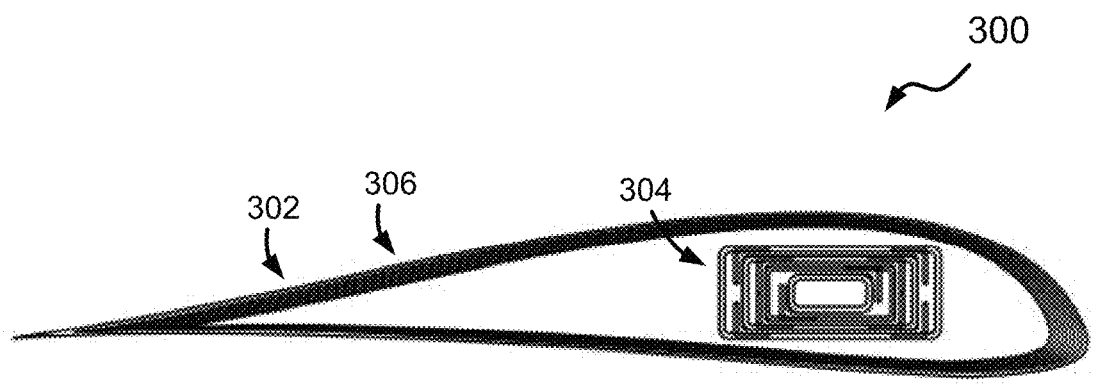
Figure 8:
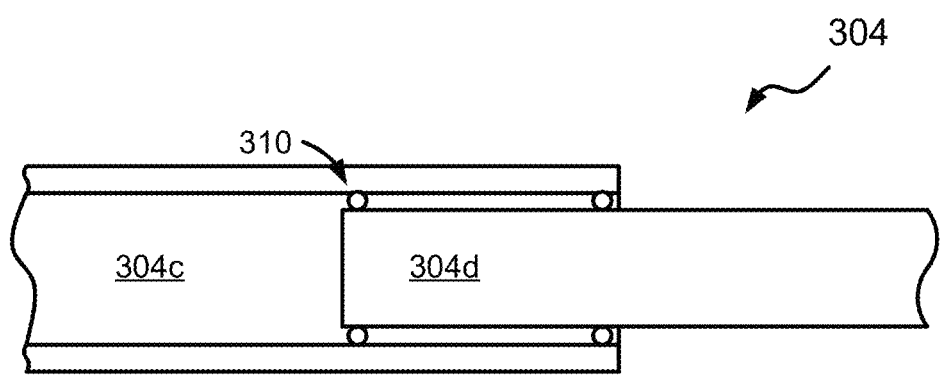

FIGS. 3 through 8 show various views of an example aircraft wing apparatus 300. FIGS. 3 and 4 show various views of the aircraft wing apparatus 300 in an extended (deployed) configuration. FIGS. 5 and 6 show various view of the aircraft wing apparatus 300 in a retracted (stowed) configuration. FIG. 7 shows a side view of the aircraft wing apparatus 300. FIG. 8 shows a cross-sectional view of an extendable spar assembly 304. As described in greater detail below, one or more features are hidden from view in some figures to highlight certain aspects of the aircraft wing apparatus 300. Additionally, certain features are shown as transparent to show internal details of the aircraft wing apparatus 300.

The aircraft wing apparatus 300 includes wing-skin sections 302a through 302d (collectively, wing-skin sections 302), the extendable spar assembly 304, and a plurality of wing ribs 306. As shown in FIG. 3, the wing-skin sections 302a through 302d provide respective airfoil surfaces spanning respective lateral distances 308a through 308d (collectively, lateral distances 308). It should be appreciated that the lateral distances 308 may differ from each other. For example, as shown, the lateral distance 308d is less than the other lateral distances 308a through 308c. Further, the lateral distances 308 may be adjusted via the extendable spar assembly 304, e.g., to better suit flight requirements of individual missions. In some embodiments, the wing-skin sections 302 are made of a non-rigid or collapsible material, e.g., fabric or thin composite.

The extendable spar assembly 304 include spar members 304a through 304d. Similar to the extendable spar assembly 104 (FIG. 1), the extendable spar assembly 304 may define one or more channels for stowing the spar members 304a through 304d. As shown, the spar member 304a define a channel for stowing the spar member 304b, the spar member defines a channel for stowing the spar member 304c, and the spar member 304c defines a channel for stowing the spar member 304d.

As best seen in FIG. 8, the spar members 304a though 304b are coupled together via respective sets of roller bearings 310. These sets of roller bearings 310 are constructed and arranged to reduce friction between individual spar members and case extension and retraction of the extendable spar 304 when acted upon by wind forces, e.g., while airborne. Further, the sets of roller bearings 310 are constructed and arranged to withstand forces acting on the aircraft wing apparatus 300 during flight. Although the sets of roller bearings 310 are provided, it should be understood that alternative couplings may be used instead, such as plain bearings, fluid bearings, and so forth.

The plurality of wing ribs 306 provides internal structural support to the wing-skin sections 302, e.g., to maintain an airfoil shape during operation. One or more wing ribs of the plurality of wing ribs 306 are fixedly attached to the extendable spar assembly 304. For example, in some embodiments, a respective wing rib is fixedly attached to an outer end of each of the spar members 304a through 304d. These wing ribs are constructed and arranged to move based on action of the extendable spar assembly 304. Additional wing ribs are interspersed between the fixedly attached wing ribs and are constructed and arranged to slide along individual spar members, e.g., to separate from each other during extension or converge toward each other during retraction.

During example operation, the aircraft wing apparatus 300 is initially in a stowed configuration, e.g., as shown in FIG. 6. When the aircraft wing apparatus 300 enters a deployed configuration, the extendable spar assembly 304 extends to a predefined position, e.g., fully extended or partially extended. As the extendable spar assembly 304 moves, the plurality of wing ribs 306 likewise extends laterally outwards. When the extendable spar assembly 304 extends, the wing ribs of the plurality of wing ribs 306 separate from each other to span a length of the aircraft wing assembly 300, e.g., as shown in FIG. 3. In this manner, the plurality of wing ribs 306 provides support for the wing-skin sections 302.

Conversely, when the extendable spar assembly 304 retracts, the wing ribs 306 converge together to reduce a lateral length of the aircraft wing assembly 300, e.g., as shown in FIG. 6. In some embodiments, the wing-skin sections 302 are made of non-rigid material (e.g., fabric) which folds or otherwise consolidates when the extendable spar assembly 304 retracts. Alternatively or in addition, one or more wing-skin sections 302 may be partially or wholly housed within another wing-skin section 302, e.g., the wing-skin section 302a. In this manner, the aircraft wing apparatus 300 may adjust a wingspan of an aircraft to best suit given mission parameters. Further details will now be provided with reference to FIGS. 9 through 10.

Figure 9:
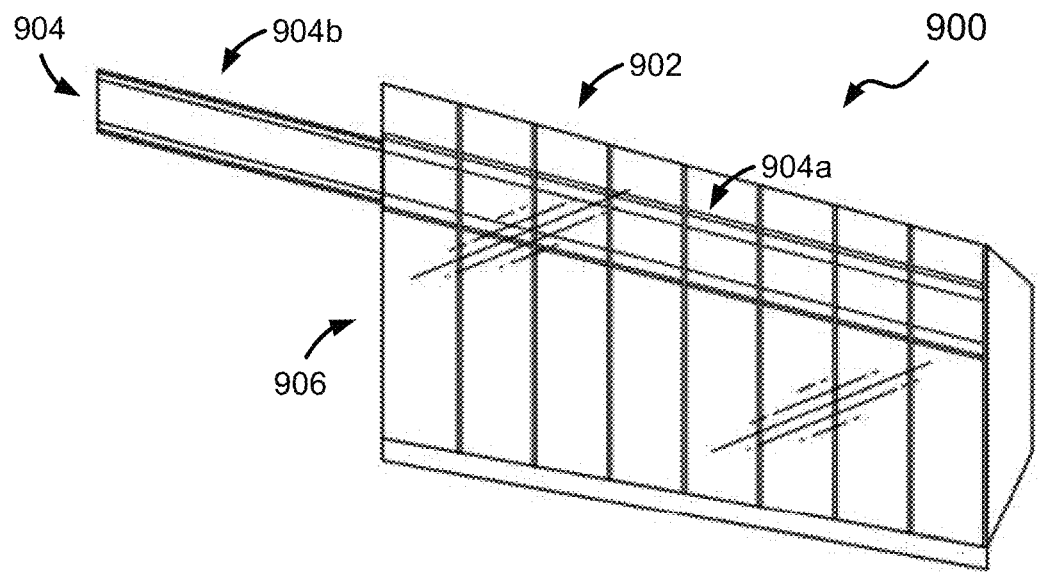
FIGS. 9-10 illustrate perspective views of yet another example aircraft wing apparatus, according to some embodiments of the present disclosure.
Figure 10:
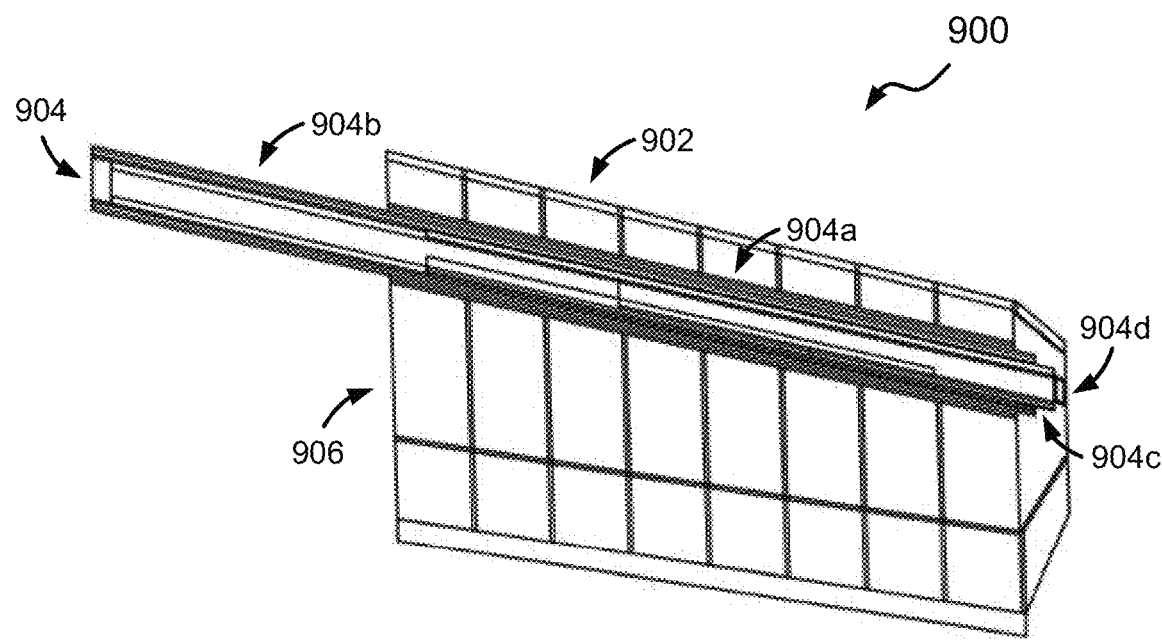

FIGS. 9 and 10 show cross-sectional views of an example aircraft wing apparatus 900. Similar to the aircraft wing apparatus 300 (FIG. 3), the aircraft wing apparatus 900 includes a wing-skin section 902, an extendable spar 904, and wing ribs 906.

FIG. 9 shows a single spar member 904a of the extendable spar 904 coupled with the wing-skin section 902 via the wing ribs 906. FIG. 10 shows additional spar members 904b through 904d nested within the spar member 904a. It should be understood that additional wing-skin sections and wing ribs may be coupled with the additional spar members 904b through 904d in a manner similar to the wing-skin section 902 and the wing ribs 906. Further details will now be provided with reference to FIGS. 11 through 13.

Figure 11:
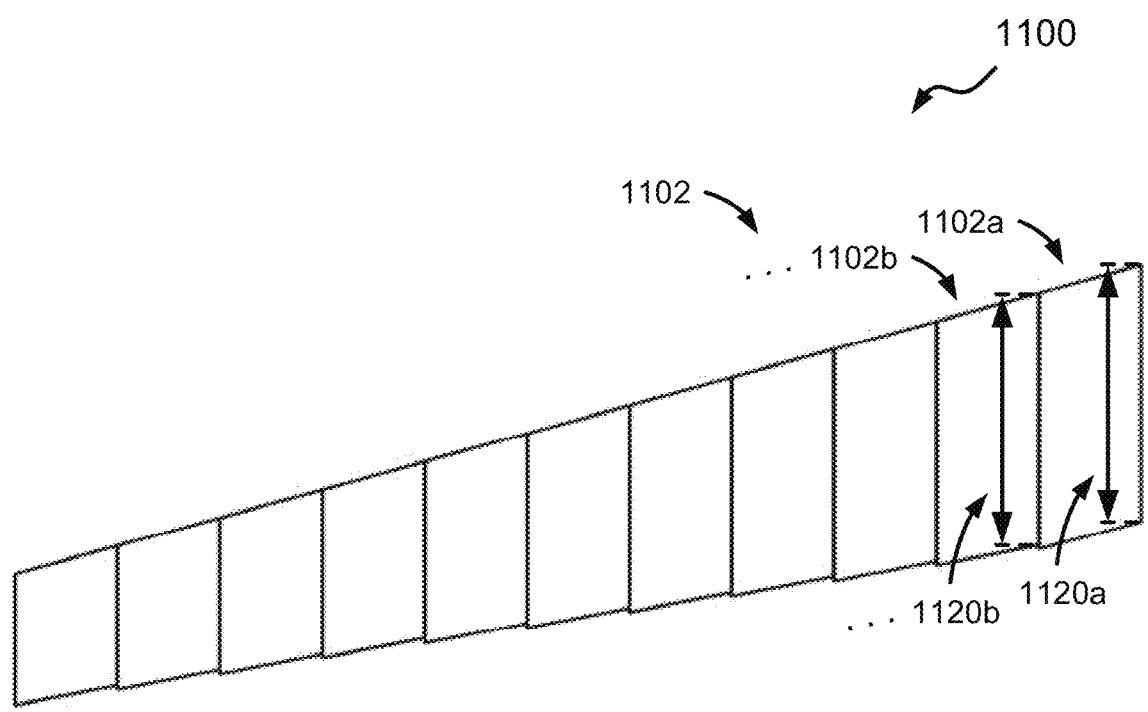
FIGS. 11-13 illustrate perspective views of yet another example aircraft wing apparatus having a swept-wing planform, according to some embodiments of the present disclosure.
Figure 12:
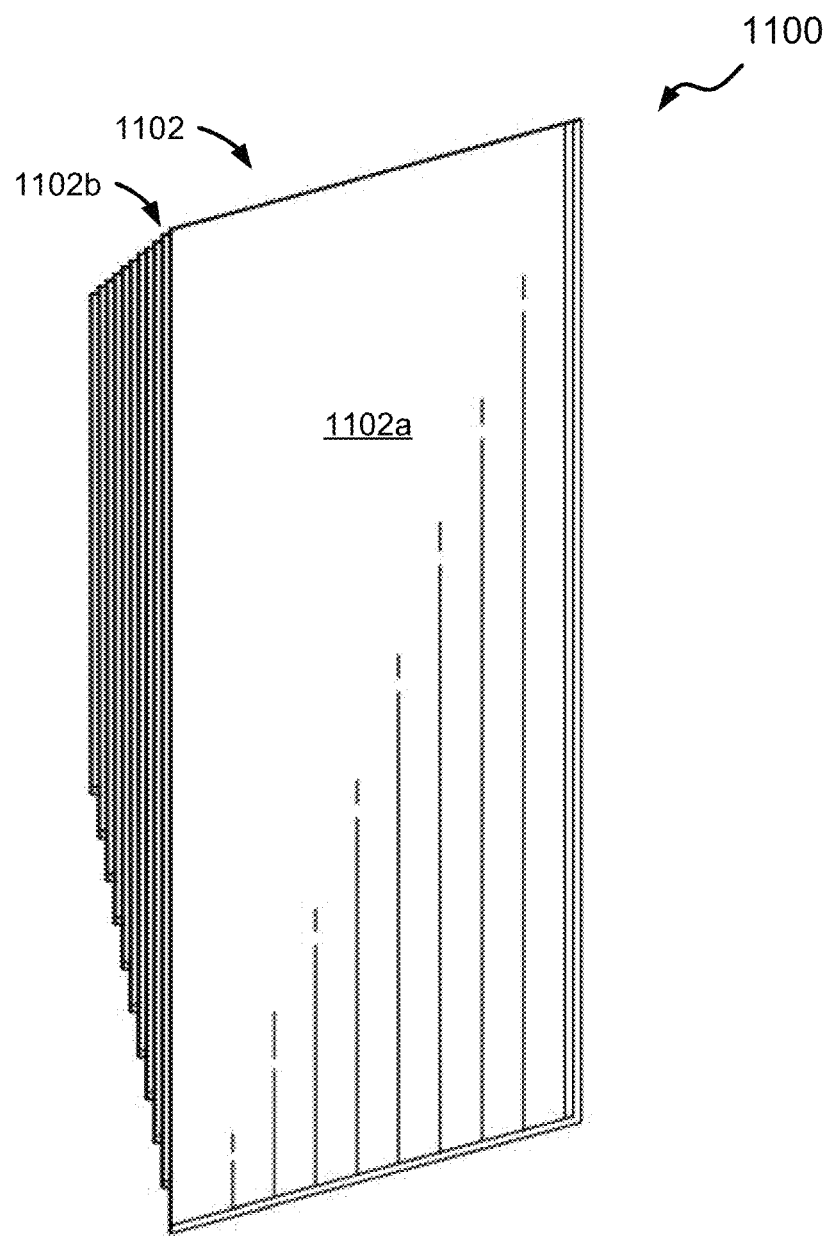
Figure 13:
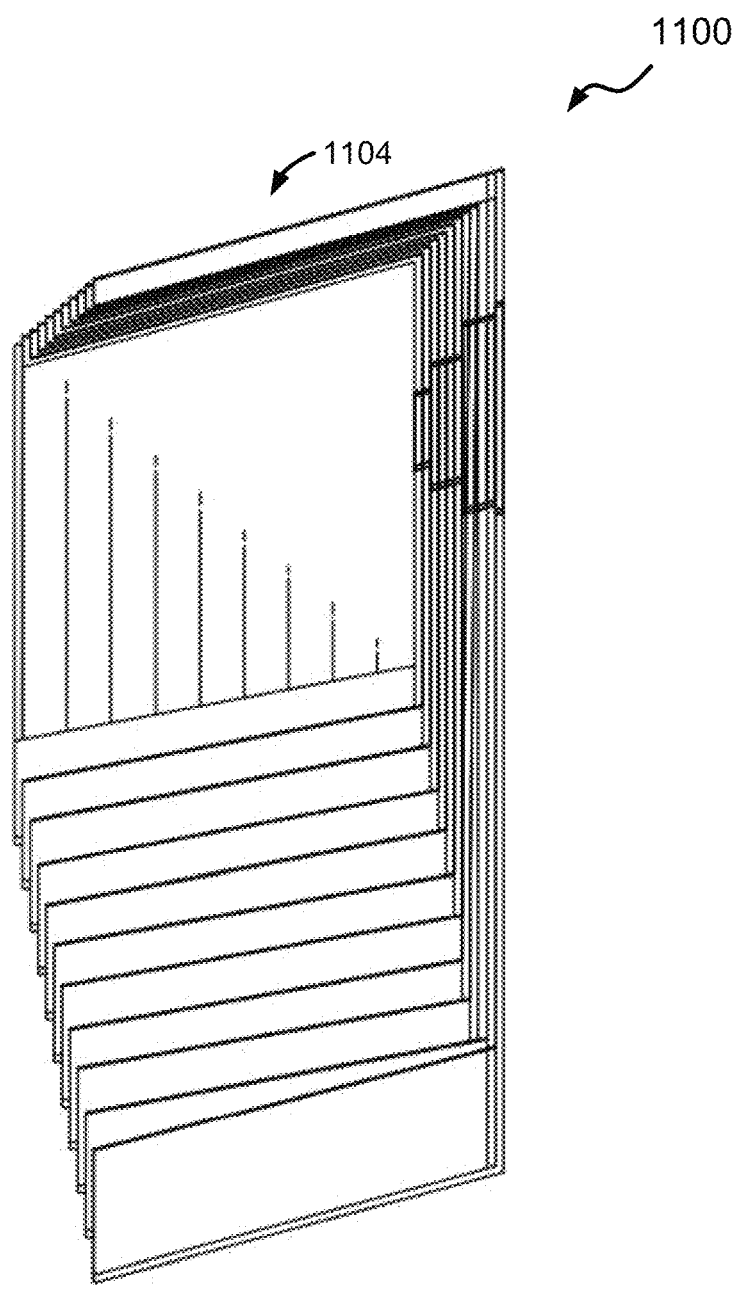

FIGS. 11 through 13 show various views of an example aircraft wing apparatus 1100. FIG. 11 shows a top-down view of the aircraft wing apparatus 1100 in a fully extended (deployed) configuration. FIG. 12 shows a top-down view of the aircraft wing apparatus 1100 in a retracted (stowed) configuration. FIG. 13 shows a perspective view of internal components of the aircraft wing apparatus 1100.

The aircraft wing apparatus 1100 includes wing-skin sections 1102a, 1102b, (collectively, wing-skin sections 1102) and an extendable spar assembly 1104. The wing-skin section 1102a is constructed and arranged to provide a swept-wing planform and couple with an aircraft body (e.g., a fuselage). Further, as best shown in FIG. 11, the wing-skin sections 1102 taper as the wing-skin sections 1102 extend away from the aircraft body. For example, the wing-skin section 1102a spans a length 1120a in an axial (forward-aft) direction, and the wing-skin section 1102b spans a smaller length 1120b in the axial direction. Based on the difference in axial lengths, the wing-skin sections 302 that are further from the aircraft body may nest within the wing-skin sections 302 that are closer to the aircraft body, e.g., as shown in FIG. 12.

The extendable spar assembly 1104 is shown in FIG. 13 and is housed within the wing-skin sections 1102. Similar to the extendable spar assembly 304 (FIG. 3), the extendable spar assembly 1104 is constructed and arranged to selectively position the wing-skin sections 1102. Further details will now be provided with reference to FIG. 14.

Figure 14:
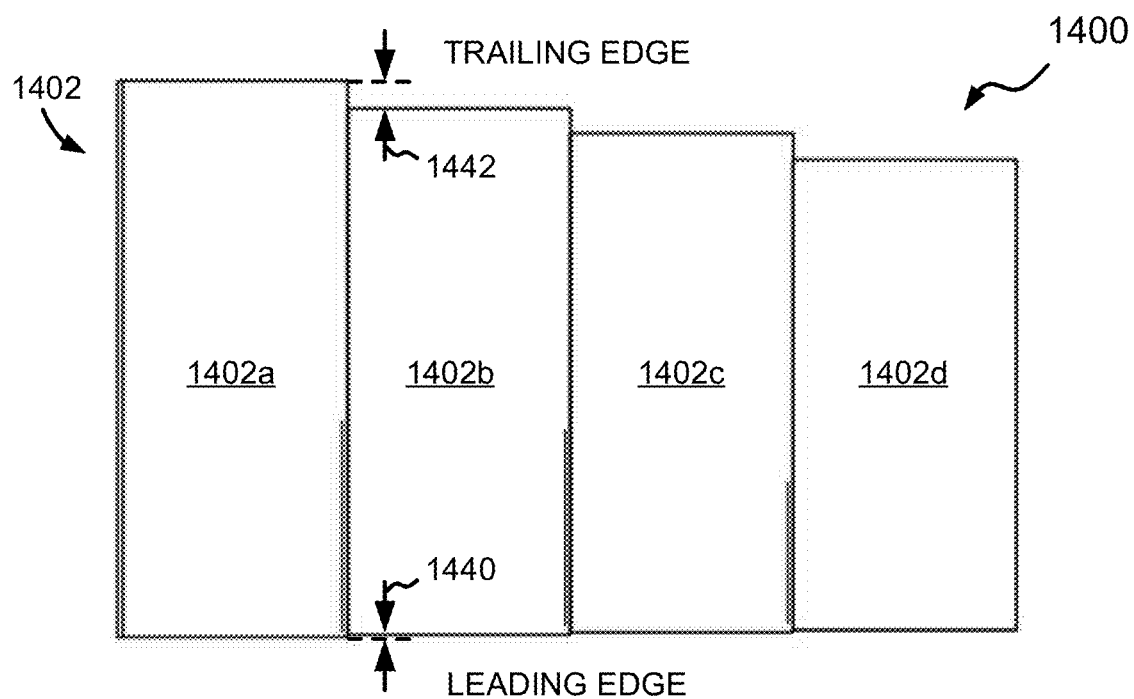
FIG. 14 illustrates a perspective view of yet another example aircraft wing apparatus having an offset wing-skin arrangement, according to some embodiments of the present disclosure.

FIG. 14 shows a top-down view of an example aircraft wing apparatus 1400.

The aircraft wing apparatus 1400 includes wing-skin sections 1402a through 1402d (collectively, wing-skin sections 1402). One or more of the wing-skin sections 1402 are constructed and arranged to slide relative to the other wing-skin sections 1402 to extend and retract the aircraft wing apparatus 1400, e.g., to the left and right as shown in FIG. 14. Further, the wing-skin sections 1402 are constructed and arranged to nest with each other. For example, the wing-skin section 1402d fits within the wing-skin section 1402c, the wing-skin section 1402c fits within the wing-skin section 1402b, and so forth.

It should be appreciated that the wing-skin sections 1402 are different sizes from each other. For example, where the wing-skin section 1402a and 1402b meet, the wing-skin section 1402a is longer than wing-skin section 1402b in an axial (forward-aft) direction, which enables the wing-skin section 1402b to fit within the wing-skin section 1402a. As a result, steps 1440 and 1442 exist between the wing-skin sections 1402a and 1402b.

To minimize the impact on aerodynamic efficiency, the wing-skin sections 1402 are offset closer to a leading edge of aircraft wing apparatus 1400, rather than a trailing edge of the aircraft wing apparatus 1400. As a result, the steps between individual wing-skin sections are smaller at the leading edge compared to the trailing edge, e.g., step 1440 at the leading edge is less than step 1442 at the trailing edge. Advantageously, with this arrangement, aerodynamic efficiency may be improved. Further details will now be provided with reference to FIG. 15.

Figure 15:
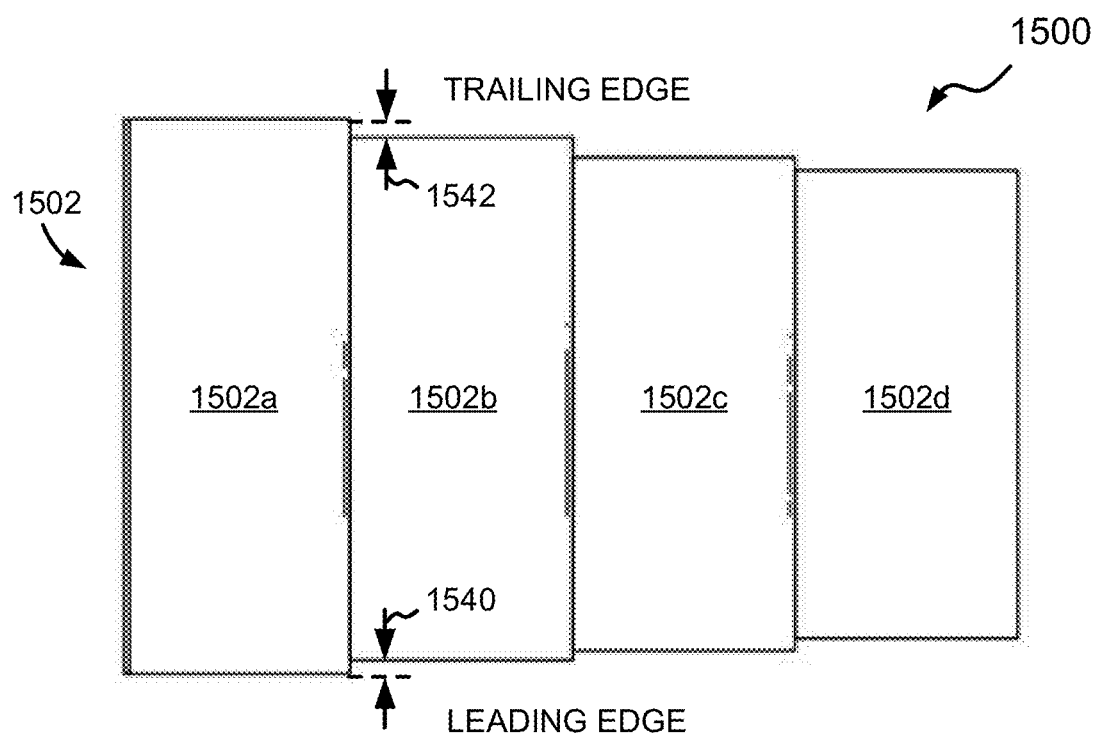
FIG. 15 illustrates a perspective view of yet another example aircraft wing apparatus having a centralized wing-skin arrangement, according to some embodiments of the present disclosure.

FIG. 15 shows a top-down view of an example aircraft wing apparatus 1500, which provides an alternative arrangement compared to the aircraft wing apparatus 1400 (FIG. 14). Similar to the aircraft wing apparatus 1400, the aircraft wing apparatus 1500 includes nesting wing-skin sections 1502a through 1502d (collectively, wing-skin sections 1502. Additionally, similar to the wing-skin sections 1402 (FIG. 14), the wing-skin sections 1502 decrease in length between individual wing-skin sections 1502, e.g., as indicated by steps 1540 and 1542.

In contrast to the wing-skin sections 1402 (FIG. 14), the wing-skin sections 1502 are centrally disposed between the trailing edge to the leading edge. That is, the steps 1540 and 1542 may be equal to each other. Advantageously, under this arrangement, construction may be simplified. Further details will now be provided with reference to FIG. 16.

Figure 16:
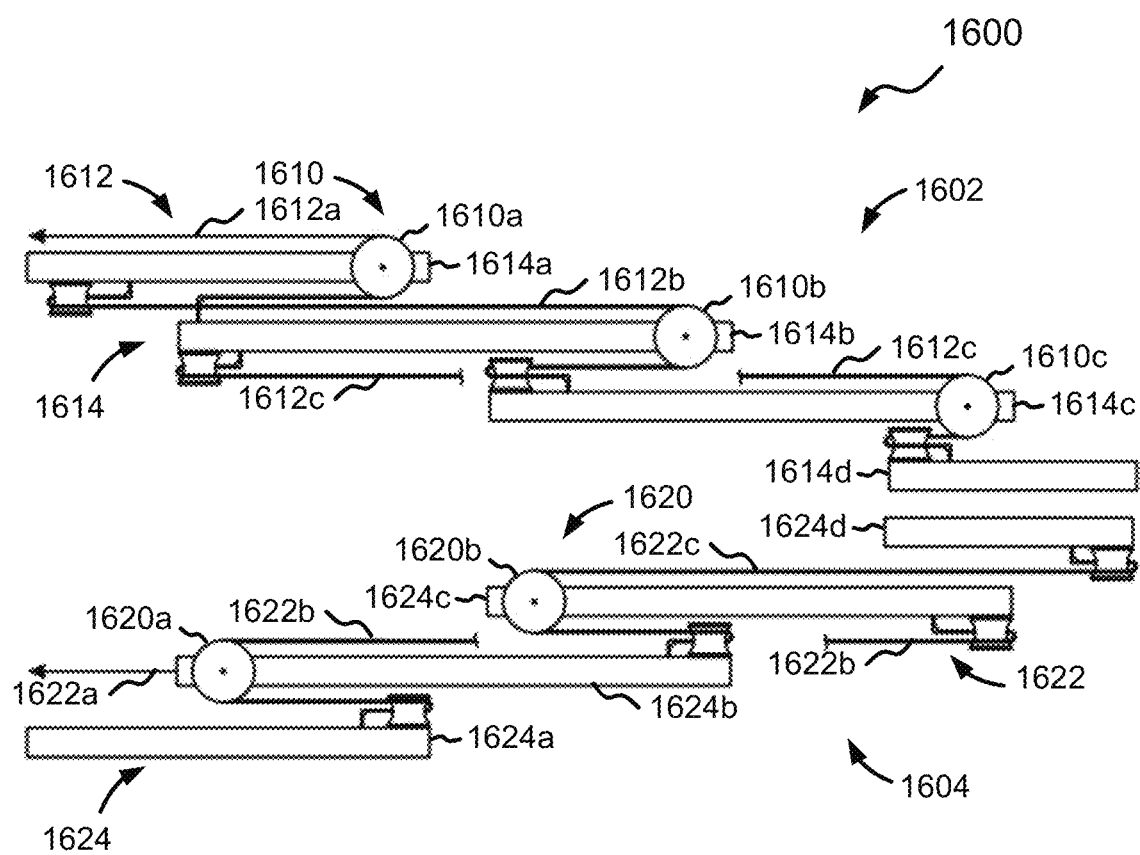
FIG. 16 is a block diagram of a controller for actuating an aircraft wing apparatus, according to some embodiments of the present disclosure.

FIG. 16 shows an example controller 1600 constructed and arranged to selectively extend and retract an extendable spar assembly, e.g., any of the extendable spar assemblies 104 (FIG. 2), 304 (FIG. 3), 904 (FIG. 9), 1104 (FIG. 13). As will be explained in further detailed below, the controller 1600 may be coupled with an aircraft body (e.g., a fuselage) and extends laterally outwards from the aircraft body. As used herein, the term "inner" refers to an end closer to the aircraft body and the term "outer" refers to an end further from the aircraft body.

The controller 1600 includes a first actuation assembly 1602 for extension, and a second actuation assembly 1604 for retraction. The first actuation assembly 1602 includes pulley wheels 1610*a* through 1610*c* (collectively, pulley wheels 1610), cables 1612*a* through 1612*c* (collectively, cables 1612), and lateral members 1614*a* through 1614*d* (collectively, lateral members 1614). The pulley wheels 1610 are coupled to respective outer portions of lateral members 1614*a* through 1614*c*. As provided in FIG. 16, the outer portions of the lateral members 1614 are positioned towards the right side of the figure and the inner portions of the lateral members 1614 are positioned towards the left side of the figure.

The cables 1612 interface with the pulley wheels 1610 and have one or more ends coupled with inner portions of the lateral members 1614. As shown, the first cable 1612*a* wraps around the first pulley wheel 1610*a* and has an end coupled with an inner portion of the second lateral member 1614*b*. The second cable 1612*b* wraps around the second pulley wheel 1610*b* and has one end coupled with an inner portion of the first lateral member 1614*a* and a second end coupled with an inner portion of the third lateral member 1614*c*. Similarly, the third cable 1612*c* wraps around the third pulley wheel 1610*c* and has one end coupled with an inner portion of the second lateral member 1614*b* and another end coupled with an inner portion of the fourth lateral member 1614*d*.

The lateral member 1614*a* may be fixed relative to the aircraft body. The remaining lateral members 1614*b* through 1614*d* are constructed and arranged to selectively slide relative to the fixed lateral member 1614*a* in a lateral direction (e.g., left and right as shown in FIG. 16). In some embodiments, the lateral members 1614 are coupled with respective spar members of the extendable spar assembly (e.g., spar members 304*a* through 304*d* as shown in FIG. 3). For example, the lateral member 1614*a* may be coupled with the spar member 304*a*, the lateral member 1614*b* may be coupled with the spar member 304*b*, and so forth. Alternatively, the lateral members 1614 may represent portions of the spar members themselves.

The second actuation assembly 1604 includes pulley wheels 1620*a* and 1620*b* (collectively, pulley wheels 1620), cables 1622*a* through 1622*c* (collectively, cables 1622), and lateral members 1624*a* through 1624*d* (collectively, lateral members 1624). The pulley wheels 1620 are coupled to respective inner portions of lateral members 1624*b* and 1624*c*.

The first cable 1622*a* is coupled with the second lateral member 1624. The remaining cables 1622*b* and 1622*c* interface with the pulley wheels 1620 and have one or more ends coupled with outer portions of the lateral members 1624. As shown, the second cable 1622*b* wraps around the first pulley wheel 1620*a* and has one end coupled with an outer portion of the first lateral member 1624*a* and another end coupled with the third lateral member 1624*c*. The third cable 1622*c* wraps around the second pulley wheel 1620*b* and has one end coupled with an outer portion of the second lateral member 1624*b* and an outer portion of the fourth lateral member 1624*d*.

The lateral member 1624*a* may be fixed relative to the aircraft body. The remaining lateral members 1624*b* through 1624*d* are constructed and arranged to selectively slide relative to the fixed lateral member 1624*a* in a lateral direction (e.g., left and right as shown in FIG. 16). In some embodiments, the lateral members 1624 are coupled with respective spar members of the extendable spar assembly (e.g., spar members 304*a* through 304*d* as shown in FIG. 3). For example, the lateral member 1624*a* may be coupled with the spar member 304*a*, the lateral member 1624*b* may be coupled with the spar member 304*b*, and so forth. Alternatively, the lateral members 1624 may represent portions of the spar members themselves.

During example operation, the controller 1600 actuates the cables 1612*a* and 1622*a* to extend and retract the extendable spar assembly. To extend the extendable spar assembly, the controller 1600 pulls a free end of the cable 1612*a* inward (e.g., to the left as shown in FIG. 16). As a result, the other end of the cable 1612*a*, which is coupled with the inner portion of the second lateral member 1614*b*, pulls the inner portion of the second lateral member 1614*b* toward the outer portion of the first lateral member 1614*a*, which moves the second lateral member 1614*b* outward relative to the first lateral member 1614*a*.

Further, as the second lateral member 1614*b* moves outward, the second lateral member 1614*b* carries the pulley wheel 1610*b* with it. The change in position of the pulley wheel 1610*b* increases a length of the cable 1612*b* on one side of the pulley wheel 1610*b*, which pulls the inner portion of the third lateral member 1614*c* towards an outer portion of the second lateral member 1614*b*. In this manner, the third lateral member 1614*c* move outward based on the extension of the second lateral member 1614*b*. Along the same lines, the fourth lateral member 1614*d* moves outward via the pulley wheel 1610*c* and cable 1612*c*. Accordingly, the controller 1600 extends the spar members of the extendable spar assembly.

To retract the extendable spar assembly, the controller 1600 pulls a free end of the cable 1622*a* inward (e.g., to the left as shown in FIG. 16), which pulls the second lateral member 1624*b* inward. As the second lateral member 1624*b* moves inward, the second lateral member 1624*b* carries the pulley wheel 1620*a* with it. The change in position of the pulley wheel 1620*a* increases a length of the cable 1622*b* on one side of the pulley wheel 1620*a*, which pulls the outer portion of the third lateral member 1614*c* towards an inner end of the second lateral member 1614*b*. In this manner, the third lateral member 1624*c* moves inward based on the retraction of the second lateral member 1624*b*. Along the same lines, the fourth lateral member 1624*d* moves inward via the pulley wheel 1620*b* and cable 1612*b*. Accordingly, the controller 1600 retracts the extendable spar assembly.

Advantageously, the above-described arrangement enables the controller 1600 to extend the spar members of the extendable spar assembly based on actuation of the single cable 1612*a*. Likewise, the controller 1600 may retract the individual spar members of the extendable spar assembly based on actuation of the single cable 1622*a*. In this manner, extension and retraction by the controller 1600 may be simplified. Additionally, this arrangement enables the controller 1600 to hold different predefined positions for different wing profiles, such as a fully stowed profile, a fully deployed profile, and a partially deployed profile.

Further, it should be appreciated that the individual lateral members 1614 and 1624 may move different lengths and/or draw distances from each other during actuation. For example, the second lateral member 1614*b* may extend a first distance relative to the first lateral member 1614*a*, and the third lateral member 1614*c* may extend a second distance relative to the second lateral member 1614*b*. Advantageously, this arrangement enables the aircraft to assume particular wing profiles during operation. Further details will now be provided with reference to FIGS. 17 and 18.

Figure 17:
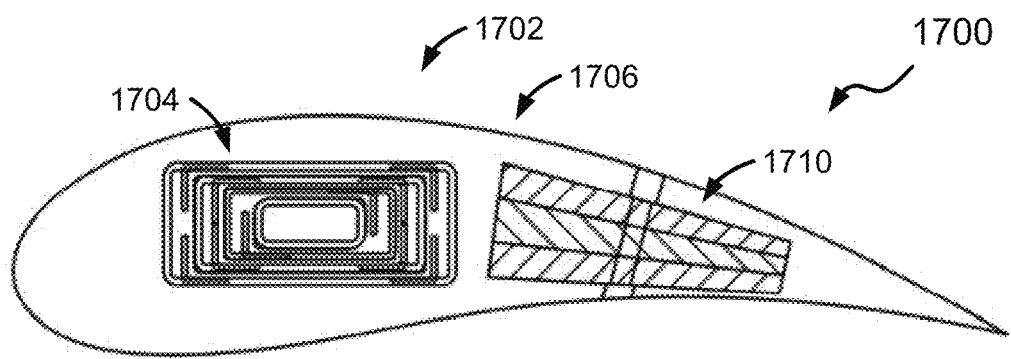
FIGS. 17-18 illustrate perspective views of yet another example aircraft wing apparatus having a scissor linkage assembly, according to some embodiments of the present disclosure.
Figure 18:
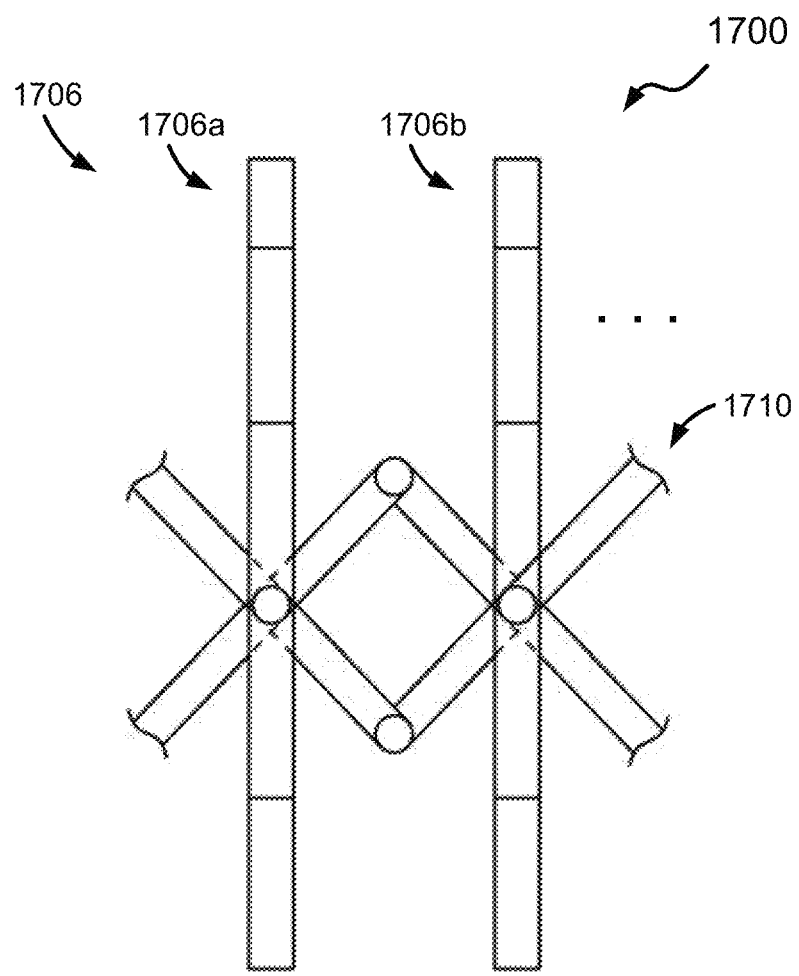

FIGS. 17 and 18 show various view of an example aircraft wing apparatus 1700 having a scissor linkage assembly 1710. FIG. 17 shows a side view of the aircraft wing apparatus 1700. FIG. 18 shows a top-down view of the scissor linkage assembly 1710. Certain features are hidden from view in FIG. 18 to highlight features of the scissor linkage assembly 1710.

The aircraft wing apparatus 1700 includes wing-skin sections 1702, an extendable spar assembly 1704, wing ribs 1706*a*, 1706*b*, . . . (collectively, a plurality of wing ribs 1706), and the scissor linkage assembly 1710. The wing-skin sections 1702, the extendable spar assembly 1704, and the plurality of wing ribs 1706 may be similar to, e.g., the wing-skin sections 302, the extendable spar assembly 304, and the plurality of wing ribs 306 described above in relation to FIG. 3.

In some embodiments, the plurality of wing ribs 1706 includes a first wing rib fixedly attached with a first spar member of the extendable spar assembly 1704, and a second wing rib fixedly attached to a second spar member of the extendable spar assembly 1704. Further, the plurality of wing ribs 1706 includes a set of wing ribs disposed between the first wing rib and the second wing rib. The set of wing ribs is sidable along one or more of the spar members of the extendable spar assembly 1704.

As shown best in FIG. 18, the scissor linkage assembly 1700 is coupled with the wing ribs 1706 and is constructed and arranged to extend and retract the wing ribs 1706 relative to each other.

During example operation, the spar members of the extendable spar assembly 1704 move outwards to deploy the wing-skin sections 1702. At the same time, the first wing rib and the second wing rib of the plurality of wing ribs 1706 separate from each other, as these wing ribs are fixedly attached to different spar members of the extendable spar assembly 1704. Further, based on the separation of the first wing rib and the second wing rib, the scissor linkage assembly 1710 causes the set of wing ribs disposed between the first wing rib and the second wing rib to likewise separate. Accordingly, the wing ribs 1706 provide support to the wing-skin sections 1702 during flight. Similar action may occur in reverse to stow the wing-skin sections 1702. Further details will now be provided with reference to FIG. 19.

Figure 19:
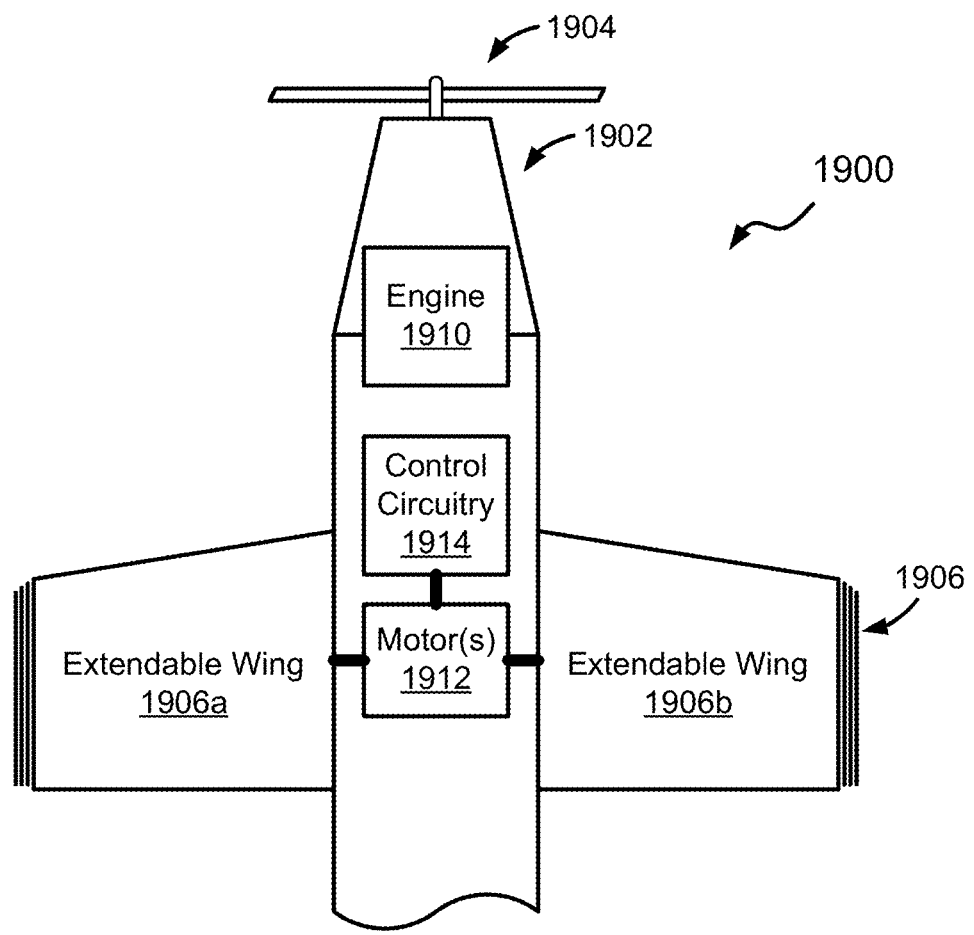
FIG. 19 is a block diagram of an aircraft having an aircraft wing apparatus, according to some embodiments of the present disclosure.

FIG. 19 shows a block diagram of an example aircraft 1900. The aircraft 1900 includes an aircraft body 1902, a propeller 1904, and aircraft wing apparatus 1906*a* and 1906*b* (collectively, aircraft wing apparatus 1906). Although the aircraft 1900 is provided as a propeller airplane, it should be understood that the aircraft 1900 is provided for example purposes. Alternative arrangements are possible, such as a helicopter, rotorcraft, and so forth. Further, in some embodiments, the aircraft 1900 includes additional componentry, such as sensors, flight controls, rotors for vertical takeoff and landing (VTOL), and so forth.

The aircraft wing apparatus 1906 may be, e.g., any of the aircraft wing apparatus 100 (FIG. 1), 300 (FIG. 3), 900 (FIG. 9), 1100 (FIG. 11), 1400 (FIG. 14), 1500 (FIG. 15), 1700 (FIG. 17).

The aircraft body 1902 is constructed and arranged to house various componentry, including an engine 1910, a set of motors 1912, and control circuitry 1914. The engine 1910 is constructed and arranged to provide power to the propeller 1904 for forward flight. The set of motors 1912 are constructed and arranged to selectively extend and retract the aircraft wing apparatus 1906 based on control by the control circuitry 1914. In some embodiments, the set of motors 1912 and the control circuitry 1914 form a part of the controller 1600 (FIG. 16). For example, the set of motors 1912 may operate to actuate the cables 1612*a* and 1622*a* of the controller 1600.

In certain embodiments, the set of motors 1912 includes different motors for actuating the cables 1612*a* and 1622*a*, respectively. The control circuitry 1914 coordinate operation of the motors to extend and retract the aircraft wing apparatus 1906. Along these lines, when the control circuitry 1914 instructs one motor to pull a respective cable (e.g., to extend or retract the aircraft wing apparatus 1906), the control circuitry 1914 further instructs the other motor to allow its respective cable to unwind.

During example operation, the set of motors 1912 extend the aircraft wing apparatus 1906 to different positions to assume different configurations. For example, the aircraft wing apparatus 1906 may assume a stowed configuration, a first deployed configuration, and a second deployed configuration that is different from the first deployed configuration. In this manner, the aircraft 1900 may assume different wing profiles to best suit parameters of a given mission. Further details will now be provided with reference to FIG. 20.

Figure 20:
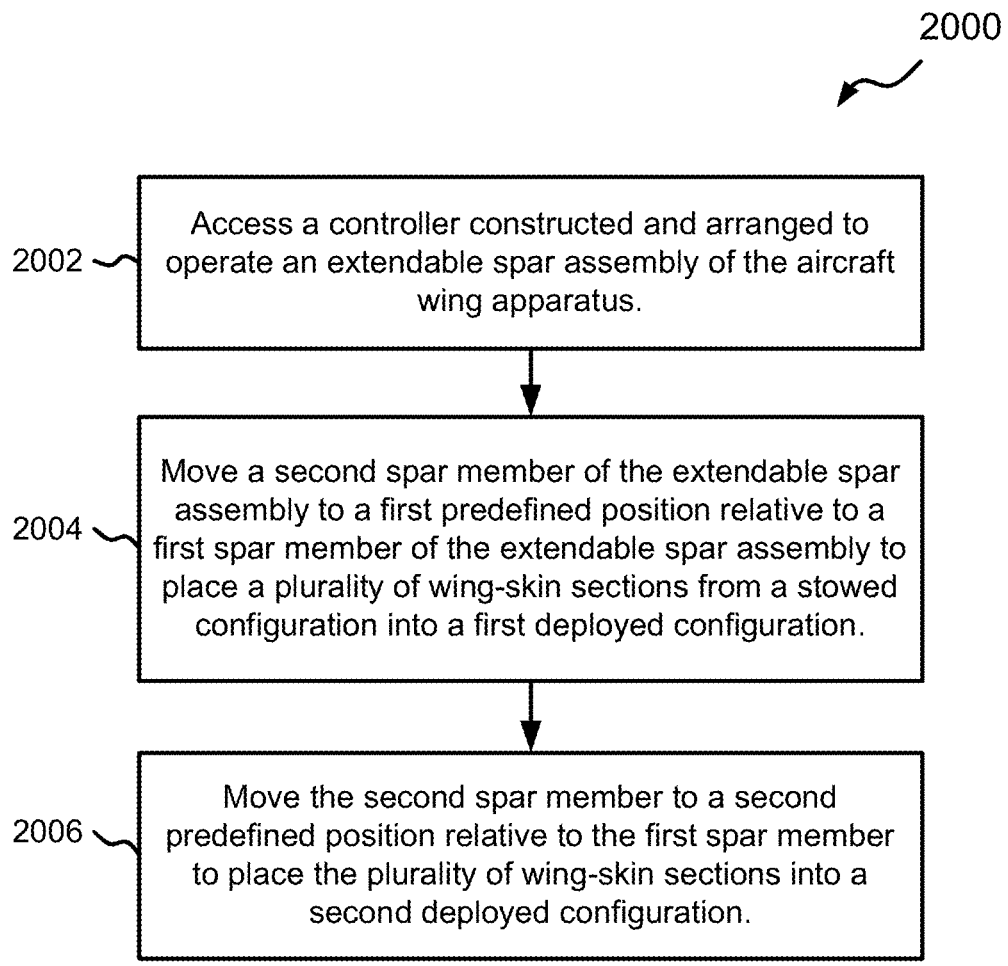
FIG. 20 is a flowchart of a method of controlling an aircraft, such as the aircraft shown in FIG. 19, according to some embodiments of the present disclosure.

FIG. 20 shows an example method 2000 for controlling an aircraft wing apparatus coupled with an aircraft, e.g., the aircraft wing apparatus 1906 coupled with aircraft 1900, as shown in FIG. 19.

At 2002, access is obtained to a controller constructed and arranged to operate an extendable spar assembly of the aircraft wing apparatus. The extendable spar assembly includes a first spar member and a second spar member. The first spar member is coupled with a first wing-skin section of a plurality of wing-skin sections. The second spar member is coupled with a second wing-skin section of the plurality of wing-skin sections.

At 2004, the controller moves the second spar member to a first predefined position relative to the first spar member. As a result, the plurality of wing-skin sections is placed from a stowed configuration into a first deployed configuration (e.g., a fully deployed configuration).

At 2006, the controller moves the second spar member to a second predefined position relative to the first spar member. As a result, the plurality of wing-skin sections is placed into a second deployed configuration (e.g., a partially deployed configuration), the first deployed configuration being different from the second deployed configuration. In this manner, the aircraft wing apparatus may be positioned to best satisfy the mission requirements.

As described above, improved techniques are directed to an aircraft wing apparatus having an extendable (or adjustable) spar. The extendable spar may be extended, in part or in whole, to increase wing surfaces that contribute to lift, increasing aerodynamic performance of an aircraft. Additionally, the extendable spar may be retracted (or consolidated) to minimize crosswind forces against the aircraft and to reduce a footprint of the aircraft, e.g., for landing and/or takeoff in locations where space is limited. In this manner, the wing apparatus provides a variety of wing profiles for different mission requirements.

While various embodiments of the present disclosure have been particularly shown and described, it will be understood by those skilled in the art that various changes in form and details may be made therein without departing from the spirit and scope of the present disclosure as defined by the appended claims.

It should be appreciated that the extendable spar assemblies described herein serve as internal beam structures which may translate within travel ranges. Such a travel range may include a position of maximum retraction (or minimum extension) and a position of maximum extension (or minimum retraction). Advantageously, in accordance with one or more embodiments, the controller 1600 (FIG. 16) is constructed and arranged to move an extendable spar assembly to a position (or particular amount of retraction/extension) within the travel range and maintain (e.g., indefinitely hold or lock) the extendable spar assembly at that position to enable an aircraft to enjoy certain aerodynamic features during flight. In this manner, the aircraft may be adapted to best suit a variety of mission parameters and flight modes (e.g., dash to target, loiter to target, combinations thereof, etc.).

It should be further understood that the controller 1600 (FIG. 16) was described above as including pulley wheels and cables for actuating an extendable spar assembly by way of example only. In accordance with certain embodiments, the extendable spar assembly may be actuated in other ways, such as using gears, actuators, pressure control, combinations thereof, and so forth. Along these lines, various apparatus such as actuators or tubes supplying fluid pressure may move one wing-skin section relative to another, and the aggregated operation of multiple actuators or multiple tubes supplying different fluid pressures, etc. may operate to control movement of the spar members relative to each other to provide certain desired wing extensions.

The scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. An aircraft wing apparatus, comprising:
a plurality of wing-skin sections including a first wing-skin section and a second wing-skin section;
an extendable spar assembly including a first spar member coupled with the first wing-skin section and a second spar member coupled with the second wing-skin section; and
a controller constructed and arranged to move the second spar member to predefined positions relative to the first spar member to place the plurality of wing-skin sections into predefined configurations, the predefined configurations including a stowed configuration, a first deployed configuration, and a second deployed position that is different from the first deployed position;
wherein the controller includes:
an actuation assembly including a pulley wheel and a pulley cable, the pulley wheel being disposed at an outer portion of the first spar member, the pulley cable interfacing with the pulley wheel and having an end coupled with an inner portion of the second spar member; and
a set of motors constructed and arranged to actuate the pulley cable to extend the second spar member relative to the first spar member.

2. The aircraft wing apparatus of claim 1, wherein the first spar member defines a channel, at least part of the second spar member being constructed and arranged to slide within the channel when moving relative to the first spar member.

3. The aircraft wing apparatus of claim 1, wherein an outer end of the second wing-skin section in the first deployed configuration laterally extends a first predefined distance away from an outer end of the first wing-skin section, and
wherein the outer end of the second wing-skin section in the second deployed configuration laterally extends a second predefined distance away from the outer end of the first wing-skin section, the first predefined distance being different from the second predefined distance.

4. The aircraft wing apparatus of claim 1, wherein the extendable spar further includes a third spar member coupled with a third wing-span section of the plurality of wing-span sections; and
wherein the actuation assembly further includes a second pulley wheel and a second pulley cable, the second pulley wheel being disposed on an outer portion of the second spar member, the second pulley cable interfacing with the second pulley wheel and being coupled between the first spar member and the third spar member, the second pulley cable being constructed and arranged to extend the third spar member relative to the first spar member based on extension of the second spar member by the set of motors.

5. The aircraft wing apparatus of claim 1, wherein the set of motors are further constructed and arranged to retract the second spar member relative to the first spar member.

6. The aircraft wing apparatus of claim 5, wherein the extendable spar further includes a third spar member coupled with a third wing-span section of the plurality of wing-span sections; and
   wherein the controller further includes:
      a retraction assembly including a retraction pulley wheel and a retraction pulley cable, the retraction pulley wheel being disposed at an inner portion of the second spar member, a retraction pulley cable interfacing with the retraction pulley wheel and being coupled with the first spar member and the third spar member, the retraction pulley cable being constructed and arranged to retract the third spar member relative to the first spar member based on retraction of the second spar member by the set of motors.

7. The aircraft wing apparatus of claim 1, wherein the first wing-skin section and the second wing-skin section include respective forward ends and respective aft ends, a first distance between the respective forward ends being less than a second distance between the respective aft ends.

8. The aircraft wing apparatus of claim 1, further comprising:
   a plurality of wing ribs disposed between the plurality of wing-skin sections and the extendable spar, the plurality of wing ribs including a first group of wing ribs which supports the first wing-skin section and a second group of wing ribs which supports the second wing-skin section.

9. The aircraft wing apparatus of claim 8, wherein wing ribs of the plurality of wing ribs are coupled together via a scissor linkage assembly, the scissor linkage assembly being constructed and arranged to extend and retract the wing ribs of the plurality of wing ribs relative to each other.

10. The aircraft wing apparatus of claim 8, wherein the plurality of wing ribs includes a first wing rib, a second wing rib, and a set of wing ribs disposed between the first wing rib and the second wing rib, the first wing rib being fixedly attached to the first spar member, the second wing rib being fixedly attached to the second spar member, the set of wing ribs being constructed and arranged to move relative to both the first wing rib and the second wing rib based on movement of the second spar member relative to the first spar member.

11. The aircraft wing apparatus of claim 1, wherein the first spar member has a first inner end and a first outer end opposite the first inner end, the pulley wheel being mounted to the first spar member at the first outer end,
   wherein the second spar member has a second inner end and a second outer end opposite the second inner end, the end of the pulley cable being coupled to the second inner end,
   wherein the pulley cable includes a first cable portion and a second cable portion, the first cable portion being disposed between a first side of the pulley wheel and the end of the pulley cable, the second cable portion being disposed on a second side of the pulley wheel, and
   wherein the set of motors constructed and arranged to actuate the pulley cable is further constructed and arranged to pull the second cable portion such that the first cable portion shortens, thereby moving the second inner end toward the first outer end and moving the second outer end away from the first outer end.

12. An aircraft, comprising:
   an aircraft body;
   an engine coupled with the aircraft body, the engine being constructed and arranged to provide power for forward flight; and
   an aircraft wing apparatus coupled with the aircraft body, the aircraft wing apparatus including:
      a plurality of wing-skin sections including a first wing-skin section and a second wing-skin section;
      an extendable spar assembly including a first spar member coupled with the first wing-skin section and a second spar member coupled with the second wing-skin section; and
      a controller constructed and arranged to move the second spar member to predefined positions relative to the first spar member to place the plurality of wing-skin sections into predefined configurations, the predefined configurations including a stowed configuration, a first deployed configuration, and a second deployed position that is different from the first deployed position;
   wherein the controller includes:
      an actuation assembly including a pulley wheel and a pulley cable, the pulley wheel being disposed at an outer portion of the first spar member, the pulley cable interfacing with the pulley wheel and having an end coupled with an inner portion of the second spar member; and
      a set of motors constructed and arranged to actuate the pulley cable to extend the second spar member relative to the first spar member.

13. The aircraft of claim 12, wherein the first spar member defines a channel, at least part of the second spar member being constructed and arranged to slide within the channel when moving relative to the first spar member.

14. The aircraft of claim 12, wherein an outer end of the second wing-skin section in the first deployed position extends a first predefined distance away from an outer end of the first wing-skin section, and
   wherein the outer end of the second wing-skin section in the second deployed position extends a second predefined distance away from the outer end of the first wing-skin section, the first predefined distance being different from the second predefined distance.

15. The aircraft of claim 12, wherein the extendable spar further includes a third spar member coupled with a third wing-span section of the plurality of wing-span sections; and
   wherein the actuation assembly further includes a second pulley wheel and a second pulley cable, the second pulley wheel being disposed on an outer portion of the second spar member, the second pulley cable interfacing with the second pulley wheel and being coupled between the first spar member and the third spar member, the second pulley cable being constructed and arranged to extend the third spar member relative to the first spar member based on extension of the second spar member by the set of motors.

16. The aircraft of claim 12, wherein the aircraft wing apparatus further includes:
   a plurality of wing ribs disposed between the plurality of wing-skin sections and the extendable spar, the plurality of wing ribs including a first group of wing ribs which supports the first wing-skin section and a second group of wing ribs which supports the second wing-skin section.

17. The aircraft of claim 16, wherein wing ribs of the plurality of wing ribs are coupled together via a scissor linkage assembly, the scissor linkage assembly being constructed and arranged to extend and retract the wing ribs of the plurality of wing ribs relative to each other.

18. The aircraft of claim 16, wherein the plurality of wing ribs includes a first wing rib, a second wing rib, and a set of wing ribs disposed between the first wing rib and the second wing rib, the first wing rib being fixedly attached to the first spar member, the second wing rib being fixedly attached to the second spar member, the set of wing ribs being constructed and arranged to move relative to both the first wing rib and the second wing rib based on movement of the second spar member relative to the first spar member.

19. A method of controlling an aircraft wing apparatus coupled with an aircraft, the method comprising:
- accessing a controller constructed and arranged to operate an extendable spar assembly of the aircraft wing apparatus, the extendable spar assembly including a first spar member and a second spar member, the first spar member being coupled with a first wing-skin section of a plurality of wing-skin sections, the second spar member being coupled with a second wing-skin section of the plurality of wing-skin sections;
- moving the second spar member to a first predefined position relative to the first spar member to place the plurality of wing-skin sections from a stowed configuration into a first deployed configuration; and
- moving the second spar member to a second predefined position relative to the first spar member to place the plurality of wing-skin sections into a second deployed configuration, the first deployed configuration being different from the second deployed configuration;

wherein the controller includes:
- an actuation assembly including a pulley wheel and a pulley cable, the pulley wheel being disposed at an outer portion of the first spar member, the pulley cable interfacing with the pulley wheel and having an end coupled with an inner portion of the second spar member; and
- a set of motors constructed and arranged to actuate the pulley cable to extend the second spar member relative to the first spar member.

* * * * *